US012642416B2

(12) United States Patent
Kim et al.

(10) Patent No.: US 12,642,416 B2
(45) Date of Patent: Jun. 2, 2026

(54) MOP CLEANING DEVICE AND CLEANING SYSTEM INCLUDING SAME

(71) Applicant: Samsung Electronics Co., Ltd., Suwon-si (KR)

(72) Inventors: Hyeoncheol Kim, Suwon-si (KR); Seehyun Kim, Suwon-si (KR); Kihwan Kwon, Suwon-si (KR); Hyunju Lee, Suwon-si (KR); Hyunho Lee, Suwon-si (KR); Wonkyu Lim, Suwon-si (KR); Seungryong Cha, Suwon-si (KR); Ingyu Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 457 days.

(21) Appl. No.: 18/064,469

(22) Filed: Dec. 12, 2022

(65) Prior Publication Data

US 2023/0138243 A1 May 4, 2023

Related U.S. Application Data

(63) Continuation of application No. PCT/KR2021/007213, filed on Jun. 9, 2021.

(30) Foreign Application Priority Data

Aug. 3, 2020 (KR) ........................ 10-2020-0096768

(51) Int. Cl.
*A47L 13/58* (2006.01)
*A47L 11/283* (2006.01)
(Continued)

(52) U.S. Cl.
CPC ........... *A47L 13/502* (2013.01); *A47L 11/283* (2013.01); *A47L 11/4038* (2013.01); *B08B 1/20* (2024.01); *B08B 3/041* (2013.01)

(58) Field of Classification Search
CPC .... A47L 1/4091; A47L 1/4038; A47L 11/283; A47L 13/58; A47L 13/20; A47L 13/51;
(Continued)

(56) References Cited

U.S. PATENT DOCUMENTS

2007/0039117 A1* 2/2007 Palmer .................... A47L 13/58
15/260
2012/0167321 A1 7/2012 Lee
(Continued)

FOREIGN PATENT DOCUMENTS

CN 107049189 A * 8/2017 ............. A47L 13/58
CN 108309173 A 7/2018
(Continued)

OTHER PUBLICATIONS

Translation of CN-107049189-A (Year: 2017).*
(Continued)

*Primary Examiner* — Tom Rodgers
(74) *Attorney, Agent, or Firm* — Jefferson IP Law, LLP

(57) ABSTRACT

A cleaning device for cleaning a mop of a mop-vacuum, and a cleaning system including same are provided. The cleaning system includes the mop, the mop-vacuum on which the mop is separably provided, and the mop cleaning device for cleaning the mop, wherein the mop cleaning device includes a main body having an opening, a cover for opening/closing the opening of the main body, a mop accommodation part provided in the opening of the main body to accommodate the mop, a water supply part provided in the main body to supply water to the mop accommodation part, a water discharge part provided in the main body to drain the water of the mop accommodation part, and a driving device which is provided at the cover, and which rotates the mop accommodated in the mop accommodation part.

15 Claims, 12 Drawing Sheets

(51) Int. Cl.

| | |
|---|---|
| ***A47L 11/40*** | (2006.01) |
| ***A47L 13/502*** | (2006.01) |
| ***B08B 1/20*** | (2024.01) |
| ***B08B 3/04*** | (2006.01) |

(58) Field of Classification Search
CPC ............... A47L 13/26; A47L 2201/024; A47L 2201/028; A47L 11/4091; A47L 11/4038; B08B 1/20; B08B 3/041
USPC .................................................... 15/104.92, 4
See application file for complete search history.

(56) References Cited

U.S. PATENT DOCUMENTS

| | | | |
|---|---|---|---|
| 2018/0028040 A1 | | 2/2018 | Delangue |
| 2020/0077858 A1 | | 3/2020 | Zhang et al. |

FOREIGN PATENT DOCUMENTS

| | | | | |
|---|---|---|---|---|
| CN | 110693404 | A | * | 1/2020 |
| CN | 111214190 | A | | 6/2020 |
| EP | 4 042 921 | A1 | | 8/2022 |
| EP | 3 485 785 | B1 | | 10/2022 |
| JP | 3226942 | U | | 7/2020 |
| KR | 20-1993-0013056 | U | | 7/1993 |
| KR | 20-0412913 | Y1 | | 4/2006 |
| KR | 100741260 | B1 | * | 7/2007 |
| KR | 20-2009-0008920 | U | | 9/2009 |
| KR | 20-2010-0001717 | U | | 2/2010 |
| KR | 20100001717 | U | * | 2/2010 |
| KR | 10-1024627 | B1 | | 3/2011 |
| KR | 20110091059 | A | * | 8/2011 |
| KR | 10-1135028 | B1 | | 4/2012 |
| KR | 10-1154281 | B1 | | 6/2012 |
| KR | 20-0464938 | Y1 | | 1/2013 |
| KR | 10-1246757 | B1 | | 3/2013 |
| KR | 10-1569058 | B1 | | 11/2015 |
| KR | 10-2019-0004349 | A | | 1/2019 |
| KR | 10-1997001 | B1 | | 7/2019 |

OTHER PUBLICATIONS

Translation of KR20100001717U (Year: 2010).*
Translation of CN-110693404-A (Year: 2020).*
Translation of KR100741260B1 (Year: 2007).*
Translation of KR20110091059A (Year: 2011).*
International Search Report dated Sep. 24, 2021, issued in International Application No. PCT/KR2021/007213.
Korean Office Action dated Nov. 29, 2024, issued in Korean Patent Application No. 10-2020-0096768.

* cited by examiner

MOP CLEANING DEVICE AND CLEANING SYSTEM INCLUDING SAME

CROSS-REFERENCE TO RELATED APPLICATION(S)

This application is a continuation application, claiming priority under § 365(c), of an International application No. PCT/KR2021/007213, filed on Jun. 9, 2021, which is based on and claims the benefit of a Korean patent application number 10-2020-0096768, filed on Aug. 3, 2020, in the Korean Intellectual Property Office, the disclosure of which is incorporated by reference herein in its entirety.

BACKGROUND

1. Field

The disclosure relates to a floorcloth washer. More particularly, the disclosure relates to a washing device for washing a floorcloth used in a mop cleaner and a cleaning system including the same.

2. Description of Related Art

A mop cleaner is generally used by attaching a wet mop to the bottom of a cleaner body.

Recently, various types of mop cleaners have been developed and distributed by emphasizing the convenience of use. In particular, a rotary mop cleaner which is configured to rotate the mop coupled to the bottom surface of the main body by a motor is popular in the market.

The rotary mop cleaner generally includes a main housing, an operation support coupled to the main housing to move the main housing, and a rotating plate rotatably coupled to the bottom surface of the main housing. The wet mop is attached to the rotating plate in a detachable manner.

Usually, the bottom surface of the rotating plate is generally configured with Velcro so that the wet mop may be attached. The wet mop has a disk shape similar to the rotating plate. One side of the wet mop is made of a fabric material to clean the floor, and the other side is made of a material so that the mop can be attached to the Velcro of the rotating plate.

The mop cleaner described above has the inconvenience of having to use the wet mop by replacing it or using it again after washing the wet mop when it becomes dirty.

For example, after cleaning is completed, the user must remove the wet mop and perform a separate washing action to clean the contaminated wet mop. In this case, because the user removes, washes, and squeeze the contaminated wet mop by hand, the user may face cumbersome and hygienic problems.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a floorcloth washer capable of automatically washing a floorcloth of a mop cleaner and a mop cleaning system including the same.

Another aspect of the disclosure is to provide a floorcloth washer capable of automatically washing and spin-drying a floorcloth and a mop cleaning system including the same.

Another aspect of the disclosure is to provide a floorcloth washer capable of automatically washing, spin-drying and drying a floorcloth and a mop cleaning system including the same.

Another aspect of the disclosure is to provide a floorcloth capable of removing a floorcloth without a user's direct touch and a mop cleaning system including the same.

Additional aspects will be set forth in part in the description which follows and, in part, will be apparent from the description, or may be learned by practice of the presented embodiments.

In accordance with an aspect of the disclosure, a mop cleaning system is provided. The mot cleaning system includes a floorcloth, a mop cleaner to which the floorcloth is detachably coupled, and a floorcloth washer configured to wash the floorcloth, and the floorcloth washer includes a body including an opening formed therein, a cover provided to open and close the opening of the body, and a cleaning station provided at the opening of the body to accommodate the floorcloth. The floorcloth washer includes a water supplier provided at the body to supply water to the cleaning station, a water drainage provided at the body to drain water of the cleaning station, and a driving device positioned at the cover and configured to rotate the floorcloth placed in the cleaning station.

The floorcloth washer further includes a rotating connector provided at the cover and connected to the driving device to allow the floorcloth to be rotatable.

The cleaning station includes a cleaning plate provided to contact with the floorcloth, and an outlet formed in the cleaning plate and configured to discharge water to the water drainage.

The cleaning plate includes a plurality of cleaning protrusions protruding upwards of the cleaning plate to increase friction with the floorcloth.

The water supplier includes a water tank detachably mounted at the body and storing water, a water pump for supplying water from the water tank to the cleaning station, and a water supply passage connecting between the water tank and the water pump.

The water drainage includes a drain tank detachably mounted at the body and storing sewage discharged from the cleaning station, and a drain valve configured to open and close a connection between the drain tank and the cleaning station.

The driving device includes a motor and a plurality of gears transmitting a driving force of the motor to the rotating connector, and at least one of the plurality of gears may be connected to the rotating connector.

The floorcloth coupler includes a rotating plate rotatably provided and a rotating shaft provided at a center of the rotating shaft and connected to a shaft of the motor.

The floorcloth coupler and the driving device may be connected by a magnet.

The floorcloth washer further includes a fan provided at the cover and supplying air to the cleaning station to dry the floorcloth.

The floorcloth washer further includes an air guide provided at the cover and guiding the air generated by the fan to the cleaning station.

The floorcloth washer further includes a water feeder provided at the cover and guiding the water supplied from the water supplier to the cleaning station.

The body further includes a guide rib provided to separate the floorcloth from the mop cleaner.

The floorcloth washer further includes at least one processor configured to control the water supplier, the water drainage, and the driving device.

Another aspect of the disclosure, a floorcloth washer includes a body including an open upper surface, a cover provided to open and close the opening of the body, a cleaning station provided at the opening of the body to accommodate the floorcloth, a water supplier provided at the body to supply water to the cleaning station, a water drainage provided at the body to drain water of the cleaning station, a driving device provided at the cover and configured to rotate the floorcloth, and a floorcloth coupler connected to the driving device to allow the floorcloth to be rotatable.

The cleaning station includes a cleaning plate provided to contact with the floorcloth, and an outlet formed in the cleaning plate and configured to discharge water to the water drainage.

The cleaning plate includes a plurality of cleaning protrusions protruding upwards of the cleaning plate to increase friction with the floorcloth.

The driving device includes a motor, a plurality of gears transmitting a driving force of the motor to the floorcloth coupler, and a rotating connector connected to at least one of the plurality of gears and provided to rotate the floorcloth coupler.

The floorcloth coupler includes a rotating plate rotatably provided and a rotating shaft provided at a center of the rotating plate and connected to a shaft of the motor.

The floorcloth washer further includes a fan provided at the cover and supplying air to the cleaning station to dry the floorcloth.

It is possible to automatically wash, spin-dry and dry a floorcloth of a mop cleaner.

In addition, the user's convenience can be improved because a floorcloth may be washed and dried automatically.

In addition, when separating a floorcloth from a mop cleaner, the floorcloth may be separated without directly touching the floorcloth. Therefore, a mop cleaning system is advantageous in hygiene.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structure.

DETAILED DESCRIPTION

Figure 1:
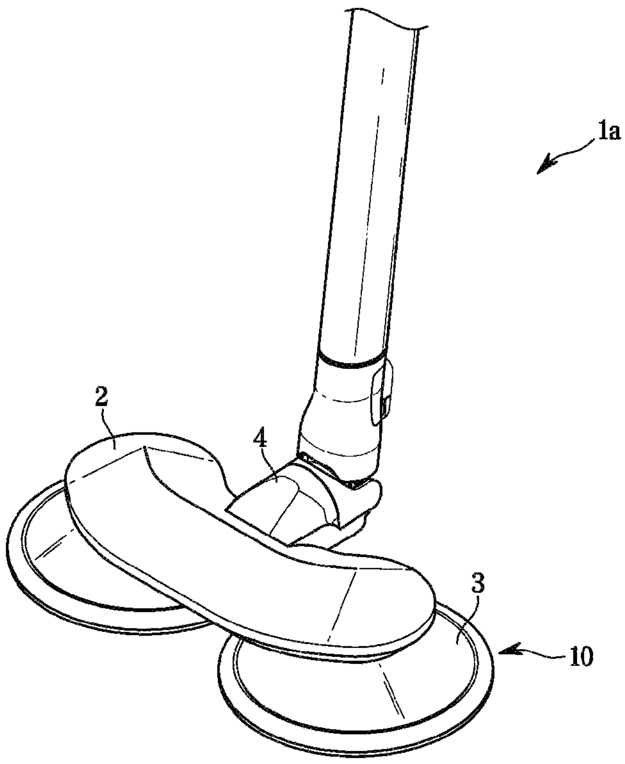
FIG. 1 is a perspective view illustrating a mop cleaner according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments described in this specification and the configurations shown in the drawings are only preferred examples of the disclosed. At the time of filing of the disclosure, there may be various modifications that can replace the embodiments and drawings of the disclosure.

In addition, the same reference numerals in each drawing of the disclosure may indicate parts or components that perform substantially the same functions.

The terminology used herein is used to describe the embodiments of the disclosure, and is not intended to restrict and/or limit the disclosed. The singular expression may include the plural expression unless the context clearly dictates otherwise. In the disclosure, terms, such as "include" or "have" may be intended to designate that a feature, number, step, operation, component, part, or combination thereof described in the specification exists. It does not preclude the possibility of the presence or addition of one or more other features or numbers, steps, operations, components, parts, or combinations thereof.

In addition, terms including ordinal numbers, such as "first" and "second" used in this specification may be used to describe various elements. The elements are not limited by the above terms. In other words, the terms are used only for the purpose of distinguishing one element from another. For example, a first element may be referred to as a second element without departing from the scope of the disclosure. Similarly, the second element may also be referred to as the first element. The term "and/or" includes any combination of a plurality of related listed items or any of a plurality of related listed items.

Additionally, the terms "front end", "rear end", "upper", "lower", "upper end", and "lower end" used in the following description are defined based on the drawings, and the shape and position of each component by this term is not limited.

FIG. 1 is a perspective view illustrating a mop cleaner according to an embodiment of the disclosure.

Referring to FIG. 1, a mop cleaning system 1 may include a mop cleaner 1*a* and a floorcloth washer 100 for washing a floorcloth 10 of the mop cleaner 1*a*.

The mop cleaner 1*a* may include a cleaner body 2 and a floorcloth coupler 3 supporting the floorcloth 10 rotatably coupled to a lower portion of the cleaner body 2. In addition, the mop cleaner 1*a* may include a handle (not shown) provided such that a user can drive the mop cleaner 1*a* by holding the handle at an upper part of the cleaner body 2, and a connector 4 connecting the cleaner body 2 and the handle.

The cleaner body 2 may be provided with a driving device (not shown) for rotationally driving the floorcloth 10 therein. A pair of floorcloth coupler 3 may be rotatably coupled to the bottom of the cleaner body 2. The floorcloth 10 may be detachably attached to a lower portion of the floorcloth coupler 3. The floorcloth coupler 3 may include a rotating plate (not shown) rotatably connected to the driving device of the cleaner body 2. The floorcloth 10 may be detachably attached to the rotating plate.

The connector 4 may be rotatably connected to the cleaner body 2. The connector 4 may be connected to the cleaner body 2 in an angle-adjustable manner. The connector 4 may further include at least one or more connection pipes.

Although not shown, the handle of the mop cleaner 1*a* may be connected to the cleaner body 2 through the connector 4. The handle may be provided with a button for driving the cleaner body 2.

The floorcloth 10 may be rotatably attached to the cleaner body 2. The cleaner body 2 may include the floorcloth coupler 3 to which the floorcloth 10 is detachably attached. The floorcloth coupler 3 may include a circular rotating plate. The floorcloth coupler 3 may be provided to connect between the cleaner body 2 and the floorcloth 10.

The floorcloth 10 may be a wet mop, and may have a circular shape similar to the rotating plate.

The floorcloth 10 may wipe the floor while rotating. The floorcloth 10 may be made of a general fabric material. The floorcloth 10 may be detachably attached to the floorcloth coupler 3 of the cleaner body 2. The floorcloth 10 may be detachably attached to Velcro of the floorcloth coupler 3 because the floorcloth is made of a general fabric material.

The floorcloth 10 may be formed in a disk shape. The floorcloth 10 may be formed with mop villi on both sides to enable double-sided use. Velcro (not shown) may be provided on the rotating plate of the floorcloth coupler 3 such that the mop villi of the floorcloth 10 may be attached.

The floorcloth washer 100 may wash the floorcloth 10. When cleaning is complete, the floorcloth 10 may be separated from the cleaner body 2 and washed. At this time, the floorcloth 10 may be automatically washed using the floorcloth washer 100.

Figure 2:
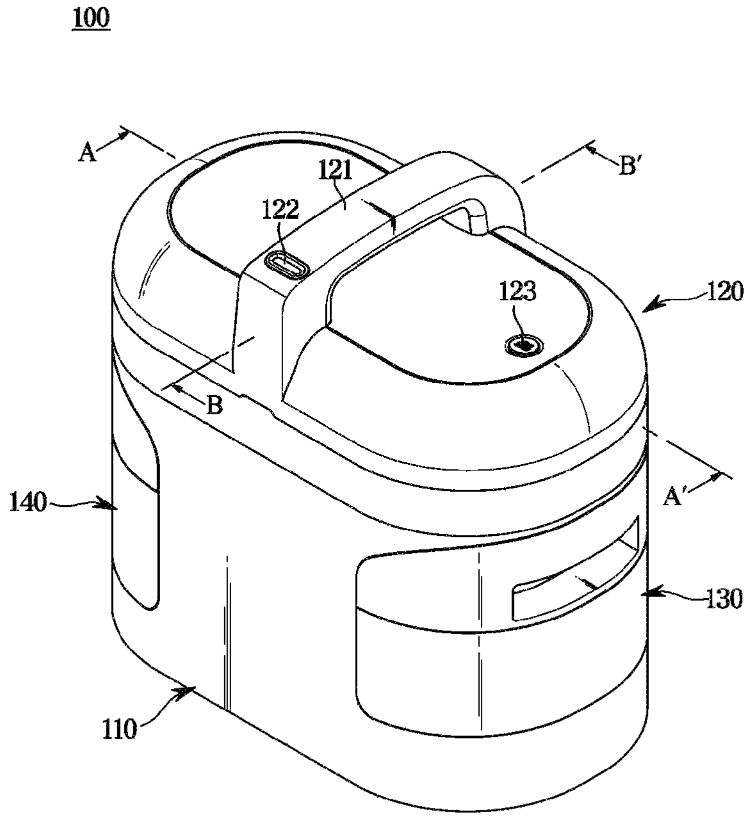
FIG. 2 is a perspective view illustrating a floorcloth washer according to an embodiment of the disclosure.

FIG. 2 is a perspective view illustrating a floorcloth washer according to an embodiment of the disclosure.

Figure 3:
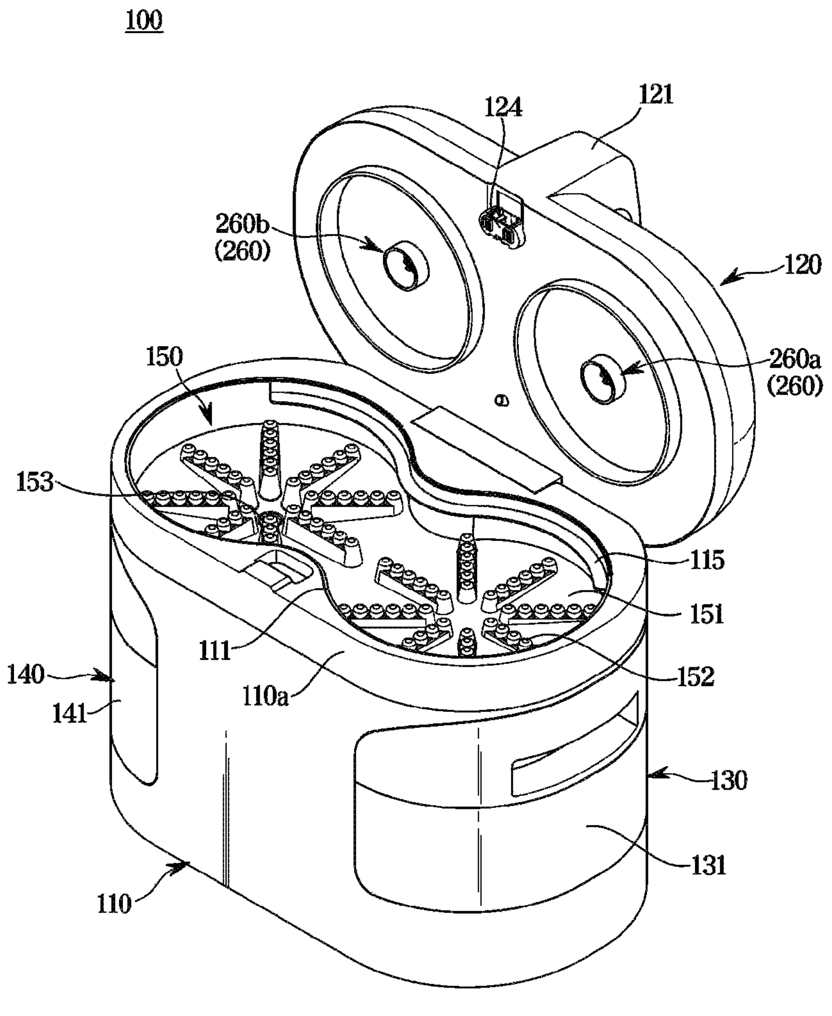
FIG. 3 is a view illustrating an open state of a cover of a floorcloth washer according to embodiment of the disclosure.

FIG. 3 is a view illustrating an open state of a cover of a floorcloth washer according to an embodiment of the disclosure.

Figure 4:
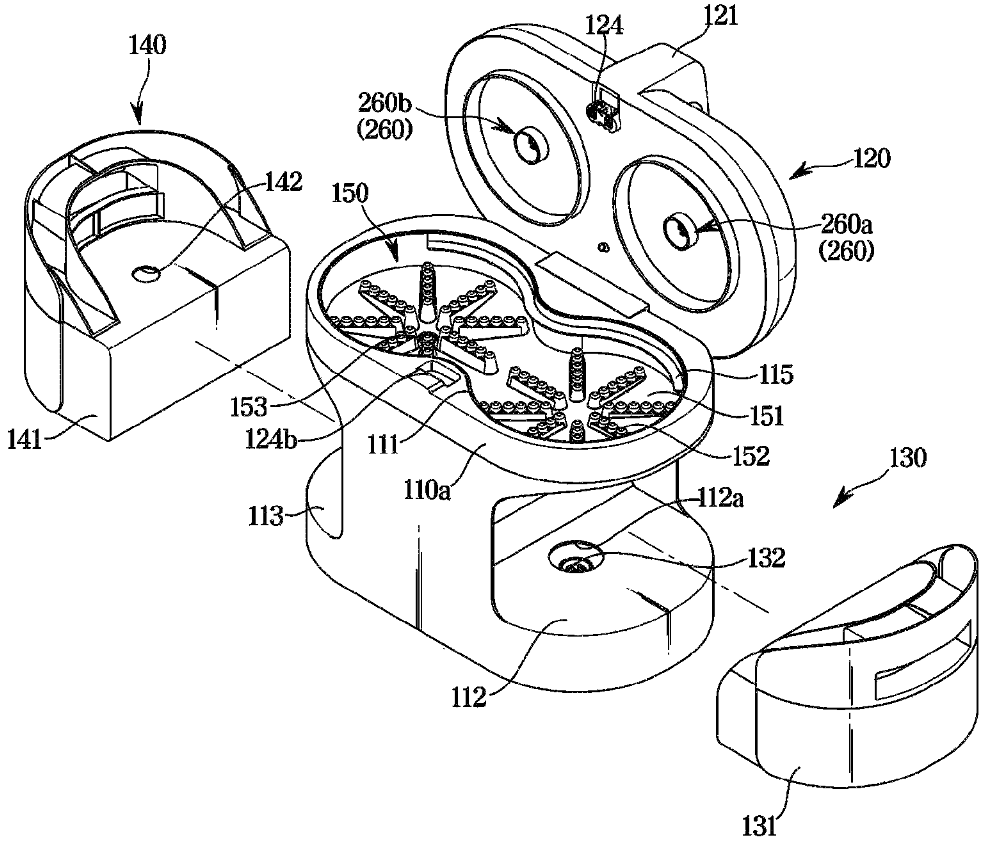
FIG. 4 is a view illustrating a water tank and a drain tank separated from a body of a floorcloth washer according to an embodiment of the disclosure.

FIG. 4 is a view illustrating a water tank and a drain tank separated from a body of a floorcloth washer according to an embodiment of the disclosure.

Figure 5:
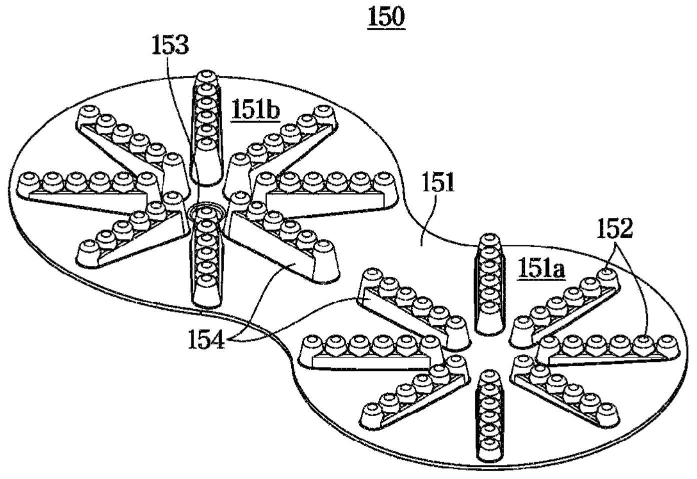
FIG. 5 is a partially exploded perspective view illustrating a floorcloth washer according to an embodiment of the disclosure.

FIG. 5 is a partially exploded perspective view illustrating a floorcloth washer according to an embodiment of the disclosure.

Referring to FIGS. 2, 3, 4, and 5, the floorcloth washer 100 may be provided to wash the floorcloth 10 of the mop cleaner 1*a*. The floorcloth washer 100 may be provided to automatically wash, spin-dry, and dry the floorcloth 10. In addition, the floorcloth washer 100 may be provided to store and rotate the floorcloth 10 separated from the mop cleaner 1*a* such that the floorcloth 10 may be washed and spin-dried.

The floorcloth washer 100 may include a body 110 including an opening 111 formed therein, and a cover 120 provided at the body 110 to open and close the opening 111. The opening 111 may be formed at an upper portion of the body 110.

The cover 120 may be rotatably coupled to the body 110. Although not shown, the body 110 and the cover 120 may be coupled by a hinge.

The cover 120 of the floorcloth washer 100 may include a handle 121 for a user to grip and a power button 123 for driving the floorcloth washer 100. A push button 122 for opening and closing the cover 120 may be provided at the handle 121 of the cover 120.

The floorcloth washer 100 may include a cleaning station 150 provided at the body 110 to accommodate the floorcloth 10, and a water supplier 130 provided at the body 110 to supply water to the cleaning station 150. In addition, the floorcloth washer 100 may include a water drainage 140 provided at the body 110 to drain sewage of the cleaning station 150, and a driving device 200 positioned at the cover 120 and provided to rotate the floorcloth 10 placed in the cleaning station 150 (refer to FIG. 6).

The body 110 of the floorcloth washer 100 may include the cleaning station 150, the water supplier 130, and the water drainage 140.

The body 110 may be provided to form an exterior. The body 110 may be formed in an elliptical shape. The body 110 may include an oval-shaped opening at an upper portion. Although the opening of the body 110 is shown as an example of an elliptical shape in this embodiment, the disclosure is not limited thereto. For example, the opening of the body 110 may be formed in various shapes, for example, a circle or a square shape, for the cleaning station 150 capable of accommodating at least one or more floorcloths.

The cleaning station 150 may be provided in the opening 111 of the body 110. In addition, the cleaning station 150 may be provided below the opening 111, and may be provided spaced apart from the upper surface of the body 110. The cleaning station 150 may provide a space in which the floorcloth 10 separated from the mop cleaner 1*a* may be placed.

The cleaning station 150 may include a cleaning plate 151 and an outlet 153 formed at the cleaning plate 151 to discharge water from the cleaning station 150. The cleaning plate 151 may include a plurality of cleaning protrusions 152 provided to protrude and increase friction with the floorcloth 10 (See FIG. 5). In this embodiment of the disclosure, the cleaning station is detachably formed in the body, but the disclosure is not limited thereto. For example, the cleaning station may be integrally formed with the body.

The cleaning plate 151 may be formed to correspond to the floorcloth 10 arranged as a pair on the left and right. The cleaning plate 151 may be formed in a plate shape. The cleaning plate 151 may be provided to wash the floorcloth 10 by friction with the cleaning plate 151 while the floorcloth 10 is rotating. The cleaning plate 151 may include the plurality of cleaning protrusions 152 for improving washing power by increasing friction with the floorcloth 10.

The cleaning plate 151 may include a first cleaning plate **151*a* and a second cleaning plate 151*b* connected to each other. The floorcloth 10 may be placed on each of the first cleaning plate 151*a* and the second cleaning plate 151*b*. The first cleaning plate 151*a* and the second cleaning plate 151*b* may be formed in a circular shape. The cleaning plate 151 may be provided in an approximately FIG. 8** shape.

The first cleaning plate **151*a* and the second cleaning plate 151*b* may each include the cleaning protrusion 152. The cleaning protrusion 152 may be formed to protrude to an upper side of the cleaning plate 151 such that the floorcloth 10 rotates to increase frictional force. The cleaning protrusion 152 may be formed in a cylindrical shape. The cleaning protrusion 152 may be formed at different heights. The cleaning protrusion 152 may be arranged in a straight line to form a cleaning protrusion array 154. The cleaning protrusion array 154 may be disposed in a circumferential direction. The cleaning protrusion array 154 may be disposed radially from the center of the circle. In the embodiment of the disclosure, the cleaning protrusion array 154 is illustrated as being including six cleaning protrusions 152. However, the disclosure is not limited thereto. The number of cleaning protrusions 152 constituting the cleaning protrusion array 154** may be changed.

A guide rib 115 for supporting at least a portion of the floorcloth 10 may be provided in the opening 111 of the body 110. The guide rib 115 may be provided to press the upper surface of the floorcloth 10 to the lower side such that the floorcloth 10 is separated from the mop cleaner **1*a*. The guide rib 115 may be formed to protrude toward the center of the opening 111. The guide rib 115 may be formed of an elastic material. Accordingly, the floorcloth 10 may be separated from the mop cleaner 1*a* by the guide ribs 115. The floorcloth 10 separated from the mop cleaner 1*a* may be accommodated in the cleaning station 150 of the floorcloth washer 100**.

The body 110 may include the water supplier 130 provided to supply water to the cleaning station 150 and the water drainage 140 provided to drain sewage of the cleaning station 150.

The body 110 may include a first installation member 112 and a second installation member 113 for installing the water supplier 130 and the water drainage 140, respectively. The water supplier 130 may be provided at the first installation member 112, and the water drainage 140 may be provided at the second installation member 113. In this embodiment of the disclosure, the water supplier is provided at the first installation member and the water drainage is provided at the second installation member, but the disclosure is not limited thereto. For example, the water drainage may be provided at the first installation member and the water supplier may be provided at the second installation member. However, it is appropriate to provide the water drainage at a location where the outlet of the cleaning plate is arranged.

The first installation member 112 may be formed at one side of the body 110, and the second installation member 113 may be formed at the other side of the body 110. In addition, the first installation member 112 may be formed by recessing at least a portion of the body 110 inward. The first installation member 112 may be formed by cutting at least a portion of the body 110 to receive the water tank 131. The first installation member 112 may include a shape corresponding to the water tank 131. The first installation member 112 may include a water tank connector **112*a* to be connected to the water tank 131. The water tank connector 112*a* may be provided at a bottom of the first installation member 112. A water supply valve 132, which will be described later, may be provided in the water tank connector 112*a*. The water tank connector 112*a* may be configured to connect the water supply valve 132 and the water tank 131**.

The second installation member 113 may be formed by recessing at least a portion of the body 110 inward. The second installation member 113 may be formed by cutting at least a portion of the body 110 to receive the drain tank 141. The second installation member 113 may include a shape corresponding to the drain tank 141. The second installation member 113 may include a drain valve connector 142 to be connected to a drain valve 144 of the water drainage 140 to be described later. The drain valve connector 142 may be formed at the upper portion of the drain tank 141. The sewage of the cleaning station 150 may be transmitted and stored in the drain tank 141 through the drain valve connector 142. The sewage stored in the drain tank 141 may be drained to the outside by separating the drain tank 141 from the body 110.

Figure 6:
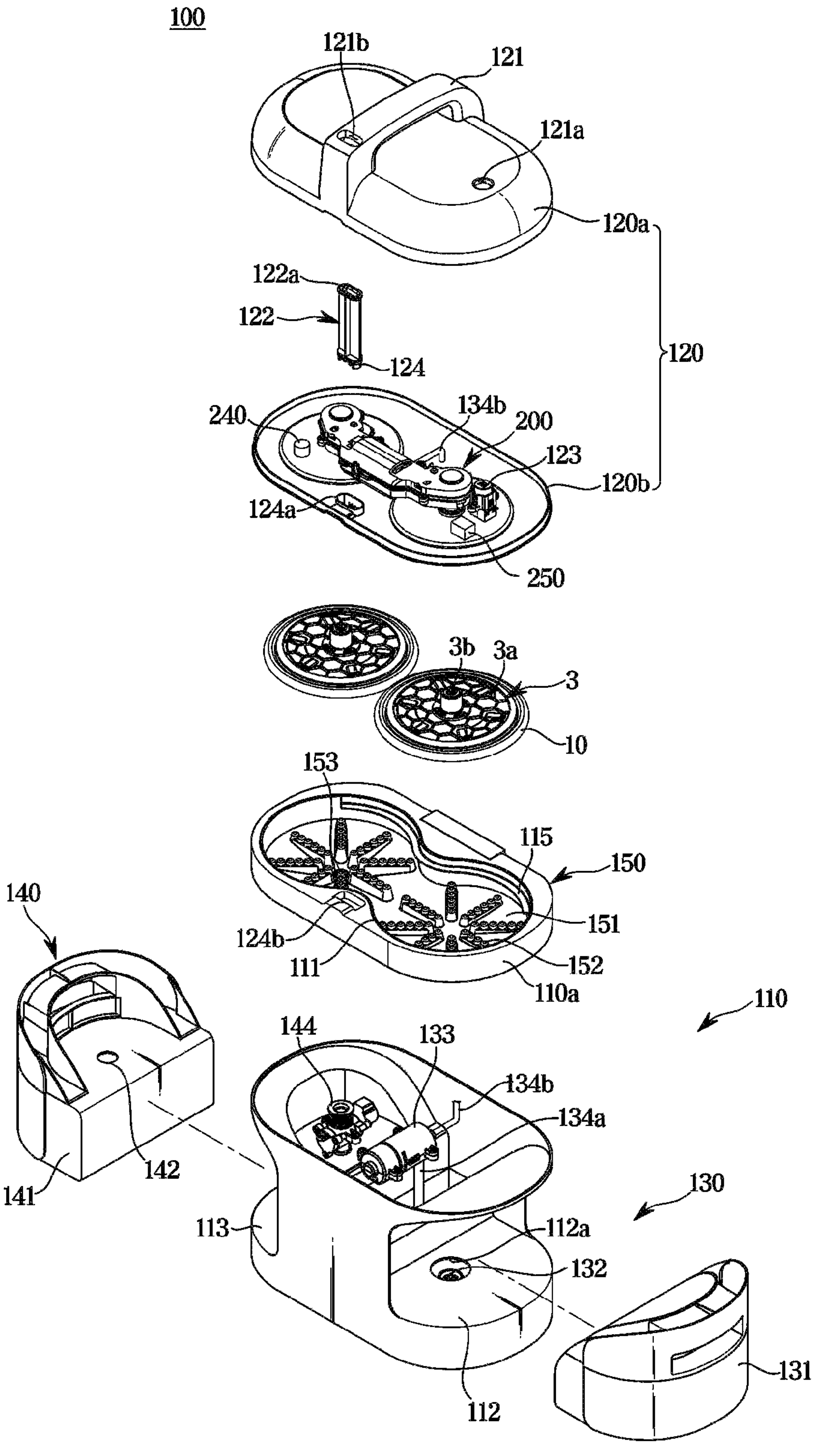
FIG. 6 is a partially exploded bottom perspective view of a floorcloth washer according to an embodiment of the disclosure.

FIG. 6 is a partially exploded bottom perspective view of a floorcloth washer according to an embodiment of the disclosure.

Figure 7:
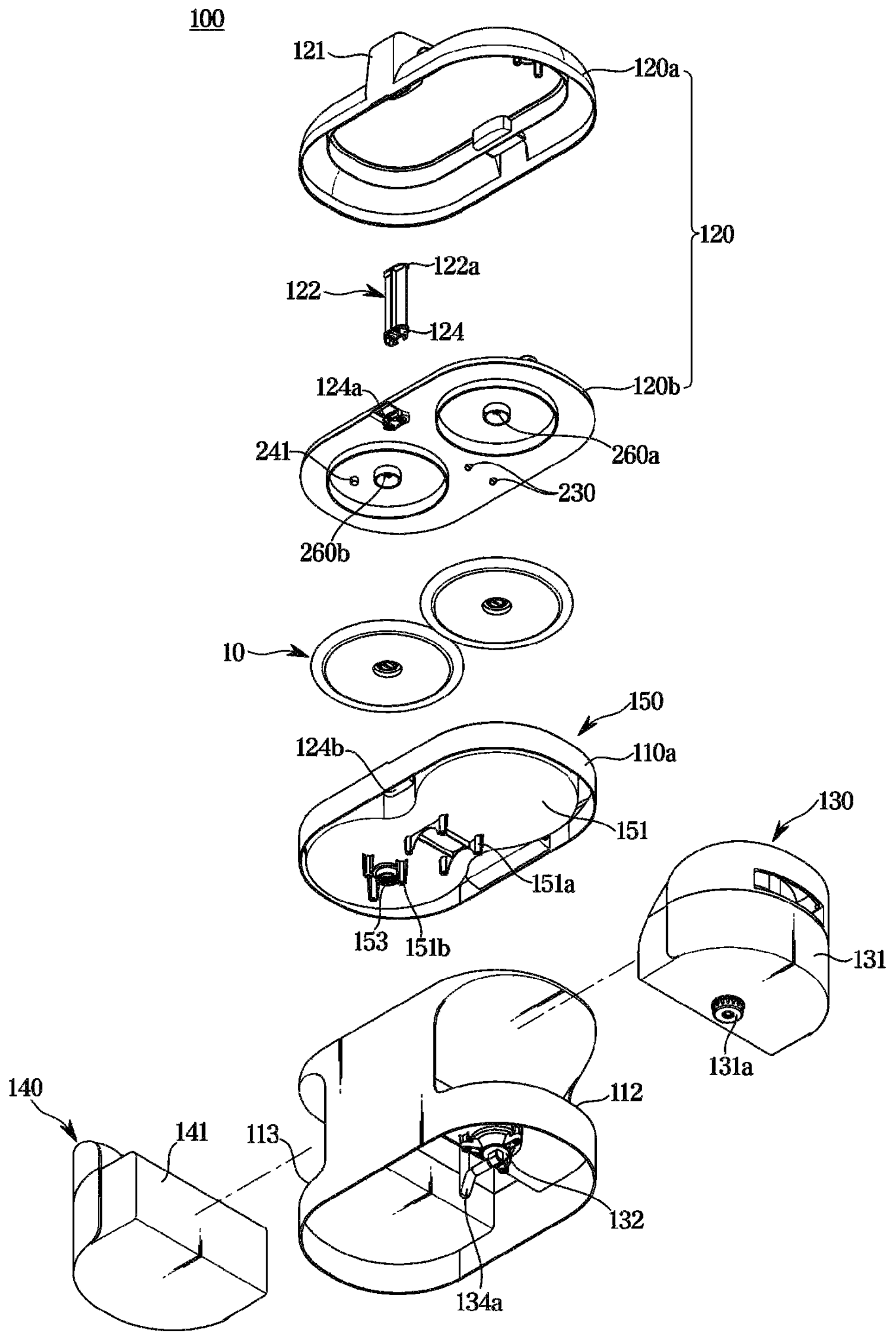
FIG. 7 is a perspective view of a cleaning station of a floorcloth washer according to an embodiment of the disclosure.

FIG. 7 is a perspective view of a cleaning station of a floorcloth washer according to an embodiment of the disclosure.

Figure 8:
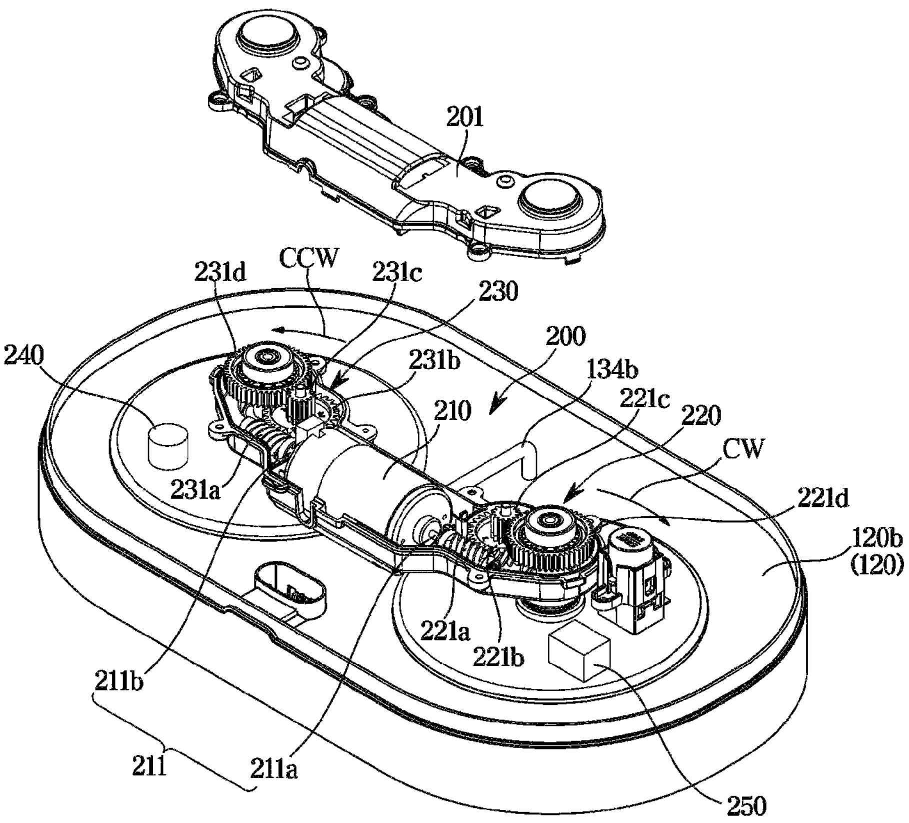
FIG. 8 is a perspective view illustrating a driving device of a floorcloth washer according to an embodiment of the disclosure.

FIG. 8 is a perspective view illustrating a driving device of a floorcloth washer according to an embodiment of the disclosure.

Figure 9:
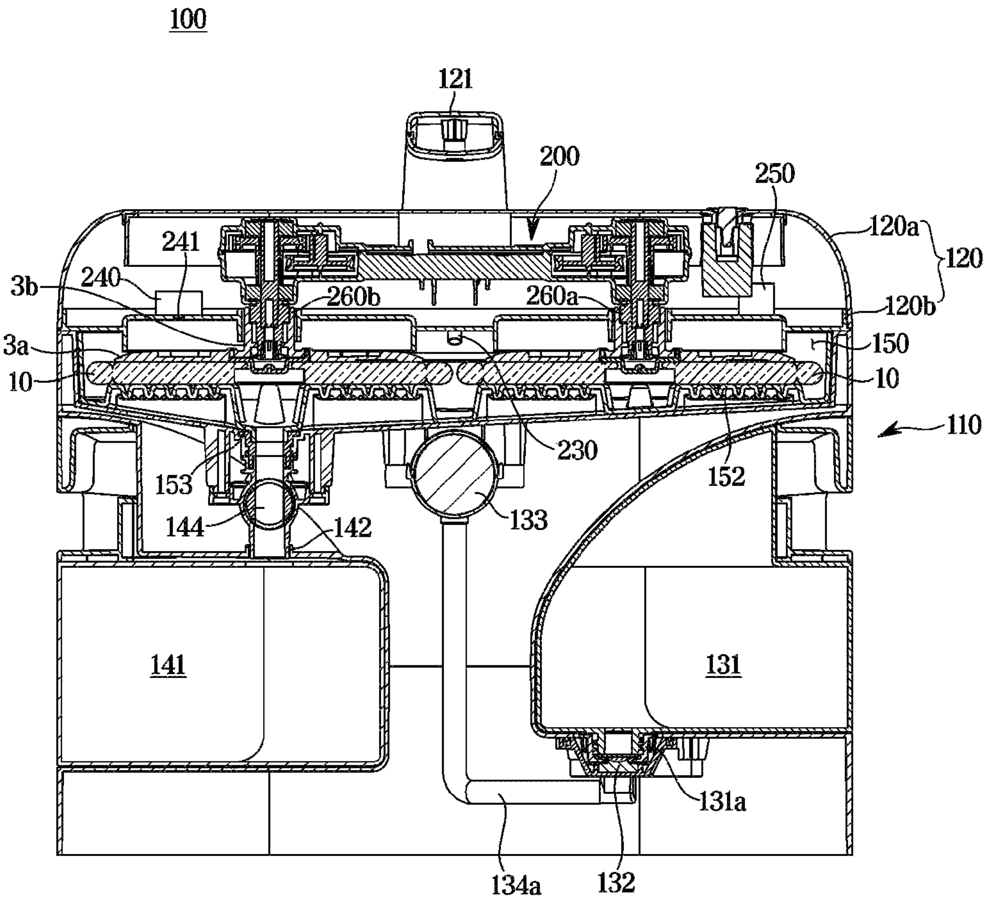
FIG. 9 is a cross-sectional view illustrating a floorcloth washer taken along line A-A' of FIG. 2 according to an embodiment of the disclosure.

FIG. 9 is a cross-sectional view illustrating a floorcloth washer taken along line A-A' of FIG. 2 according to an embodiment of the disclosure.

Figure 10:
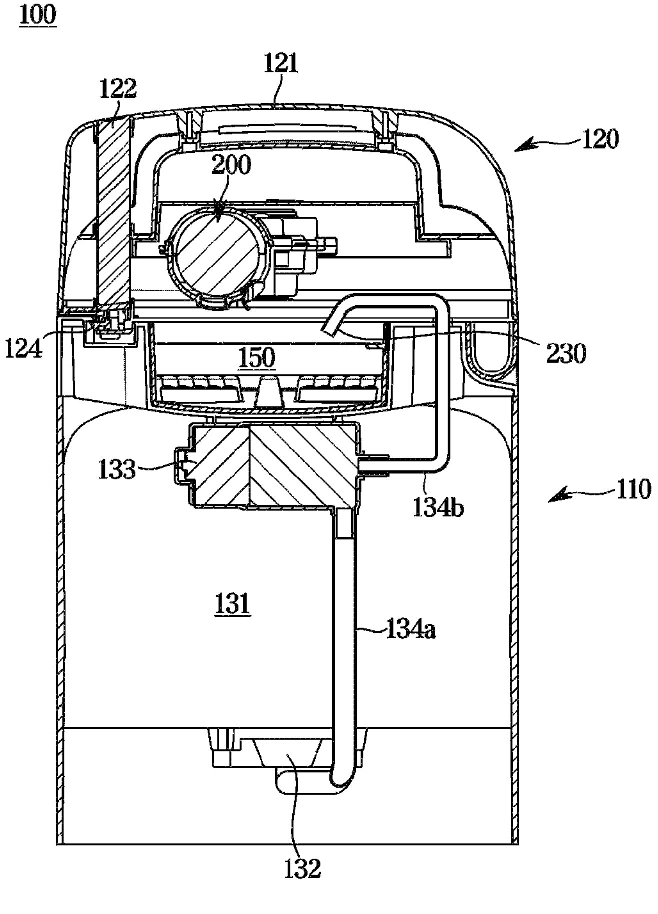
FIG. 10 is a cross-sectional view taken along line B-B' of FIG. 2, particularly, a view illustrating a floorcloth washer to which a mop cleaner is mounted according to an embodiment of the disclosure.

FIG. 10 is a cross-sectional view taken along line B-B' of FIG. 2, particularly, a view illustrating a floorcloth washer, to which a mop cleaner is mounted according to an embodiment of the disclosure.

Referring FIGS. 6, 7, 8, 9, and 10, the floorcloth washer 100 may include the body 110 and the cover 120 rotatably coupled to the body 110.

The floorcloth 10 may be disposed between the cover 120 and the body 110. The floorcloth 10 may be accommodated to be rotatable in the cleaning station 150 provided in the body 110.

The cover 120 may include a first cover **120*a* forming an upper surface, and a second cover 120*b* coupled to the first cover 120*a* and forming a lower surface. The first cover 120*a* may be provided to be coupled to the second cover 120*b*, and may be coupled from an upper side of the second cover 120*b* to form a space for installing the driving device 200** therein.

The first cover **120*a* may include the handle 121 to be gripped by a user, a power button mounting 121*a*, and a push button mounting member 121***b*. The push button mounting member 121*b* may be positioned at the handle 121 to allow a user to easily grip the push button mounting member 121*b*.

The power button mounting member 121*b* may be provided at the first cover 120*a*.

The push button 122 may include a push 122*a* and a hook 124. The hook 124 may be provided to be coupled to a hook coupler 124*b* of the body 110 by passing through the push button mounting member 121*b* of the second cover 120*b* to be described later by the push 122*a*. The push 122*a* may be provided at an upper portion of the push button 122, and the hook 124 may be provided at a lower portion of the push button 122. The push 122*a* may be coupled to the push button mounting member 121*b* of the first cover 120*a*. At least a portion of the push 122*a* may be exposed on the first cover 120*a* to allow the user to press the push 122.

The second cover 120*b* is coupled to the first cover 120*a* to form a bottom. The second cover 120*b* may include a push button mounting hole 124*a* through which the hook 124 of the push button 122 passes. The power button 123 for driving the driving device 200 of the floorcloth washer 100 may be positioned at the second cover 120*b*. The driving device 200 configured to rotate the floorcloth 10 may be installed at the second cover 120*b*. The second cover 120*b* may include a controller 250 for controlling the driving device 200 by the power button 123. The controller 250 may control the water supplier 130, the water drainage 140, and the driving device 200 of the floorcloth washer 100.

A fan 240 supplying air to the cleaning station 150 may be installed at the second cover 120*b*. The fan 240 may be installed at the second cover 120*b*. An air guide 241 may be provided at the second cover 120*b* to allow air generated from the fan 240 to be supplied to the cleaning station 150. The air guide 241 may include a plurality of holes or slits.

The second cover 120*b* may include a water feeder 230 formed to deliver the water supplied from the water supplier 130 to the cleaning station 150. The water feeder 230 may include a plurality of holes.

A rotating connector 260 may be provided on the bottom surface of the second cover 120*b*. Because the rotating connector 260 is connected to the driving device 200, the rotating connector 260 may be configured to rotate the floorcloth 10.

The rotating connector 260 provided at the second cover 120*b* may include a first rotating connector 260*a* connected to a first motor shaft 211*a*, and a second rotating connector 260*b* connected to a second motor shaft 211*b*. The first rotating connector 260*a* and the second rotating connector 260*b* may be respectively connected to the floorcloth 10, so as to allow the floorcloth 10 to be rotatable.

The floorcloth 10 may be rotatably connected to the driving device 200 of the cover 120 through the floorcloth coupler 3.

The floorcloth coupler 3 may include a rotating plate 3*a* having a disk shape, and a rotating shaft 3*b* provided at the center of the rotating plate 3*a* and connected to the driving device 200. The rotating plate 3*a* may be provided in a size and shape corresponding to the floorcloth 10. An attachment surface (not shown) of the rotating plate 3*a* may be provided such that the floorcloth 10 may be attached thereto. Velcro (not shown) may be configured on the attachment surface such that the floorcloth 10 may rotate together with the rotating plate 3*a*.

The rotating shaft 3*b* of the floorcloth coupler 3 may be connected to the driving device 200. The floorcloth coupler 3 may be connected to the driving device 200 by a magnet. The rotating shaft 3*b* of the floorcloth coupler 3 may be made of magnet material and connected to the driving device 200. At least a portion of the driving device 200 may be made of a magnetic material and connected to the rotating shaft 3*b*.

The driving device 200 may include a motor 210, a rotating connector 260 transmitting the driving force of the motor 210 to the floorcloth 10, and reduction gears 220 and 230. The reduction gears 220 and 230 may be positioned between the motor shaft 211 of the motor 210 and the rotating connector 260 (refer to FIG. 8). The driving device 200 may be installed at the second cover 120*b*. The driving device 200 may be covered by a driving device cap 201.

The motor 210 may include the first motor shaft 211*a* and the second motor shaft 211*b* formed at opposite sides. The first reduction gear 220 connected to the first motor shaft 211*a* may include a plurality of reduction gears 221*a*, 221*b*, 221*c*, and 221*d*. One of the first reduction gears 221*a*, 221*b*, 221*c*, and 221*d* may be connected to the rotating connector 260 provided at the cover 120. One of the first reduction gears 221*a*, 221*b*, 221*c*, and 221*d* may be connected to the first rotating connector 260*a* provided at the second cover 120*b*.

The second reduction gear 230 connected to the second motor shaft 211*b* may include a plurality of reduction gears 231*a*, 231*b*, 231*c*, and 231*d*. One of the second reduction gears 231*a*, 231*b*, 231*c*, and 231*d* may be connected to the rotating connector 260 provided at the cover 120. One of the second reduction gears 231*a*, 231*b*, 231*c*, and 231*d* may be connected to the second rotating connector 260*b* provided at the second cover 120*b*.

The body 110 of the floorcloth washer 100 may include the cleaning station 150, the water supplier 130, and the water drainage 140.

The cleaning station 150 may include the cleaning plate 151 in which the floorcloth 10 is washed. The cleaning plate 151 may be positioned in the opening 111 of the body 110.

A water pump bracket 151*a* and a drain pump bracket 151*b* may be provided under the cleaning plate 151. The water pump bracket 151*a* is configured for installing the water pump 133 of the water supplier 130. The drain pump bracket 151*b* is configured for installing the drain valve 144 of the water drainage 140.

The body 110 may include a frame 110*a* forming the opening 111. The frame 110*a* may include the opening 111 provided at the upper portion of the body 110 to form the cleaning station 150. In the embodiment of the disclosure, the frame is illustrated as being separated from the body, but the disclosure is not limited thereto. For example, the frame may be integrally formed with the opening of the body.

The frame 110*a* of the body 110 may include the hook coupler 124*b* for coupling the push button 122 of the cover 120. The hook coupler 124*b* may allow the hook 124 of the push button 122 to be locked or unlocked.

The body 110 may include the water pump 133 for supplying water from the water tank 131 to the cleaning station 150, and a water supply passage 134 connecting between the water pump 133 and the water tank 131.

The water tank 131 may be provided to store water therein. The water tank 131 may be formed in a shape corresponding to the first installation member 112 of the body 110. At the bottom of the water tank 131, a water supply valve connector 131*a* putting water into or out of the water tank 131 may be provided. The water supply valve connector 131*a* may be detachably provided at the water tank 131. The water supply valve connector 131*a* may be provided to be connected to the water supply valve 132 of the body 110. The water supply valve connector 131*a* may supply water from the water tank 131 to the cleaning station 150 through the water supply valve 132.

The water supplier 130 may include the water supply passage 134 connecting the water tank 131 and the water pump 133. The water supply passage 134 may include a first water supply pipe 134*a* and a second water supply pipe 134*b*. The water supply valve 132 installed in the body 110 may be connected to the water pump 133 through the first water supply pipe 134*a*. The water pump 133 may be connected to the water feeder 230 of the cover 120 through the second water supply pipe 134*b*. Although the second water supply pipe connected to the water pump is connected to the water supply pipe provided at the cover in the embodiment of the disclosure, the disclosure is not limited thereto. For example, the second water supply pipe may be provided in the body including the cleaning station.

The body 110 may include the drain valve 144 for discharging water from the cleaning station 150 to the drain tank 141. The drain valve 144 may be installed at the outlet 153 formed at the cleaning plate 151. The drain valve 144 of the body 110 may be provided at a position corresponding to the outlet 153. The drain valve 144 may connect the drain tank 141 to the drain valve connector 4. The drain tank 141 may receive sewage generated from the cleaning station 150 through the drain valve connector 4.

Figure 11:
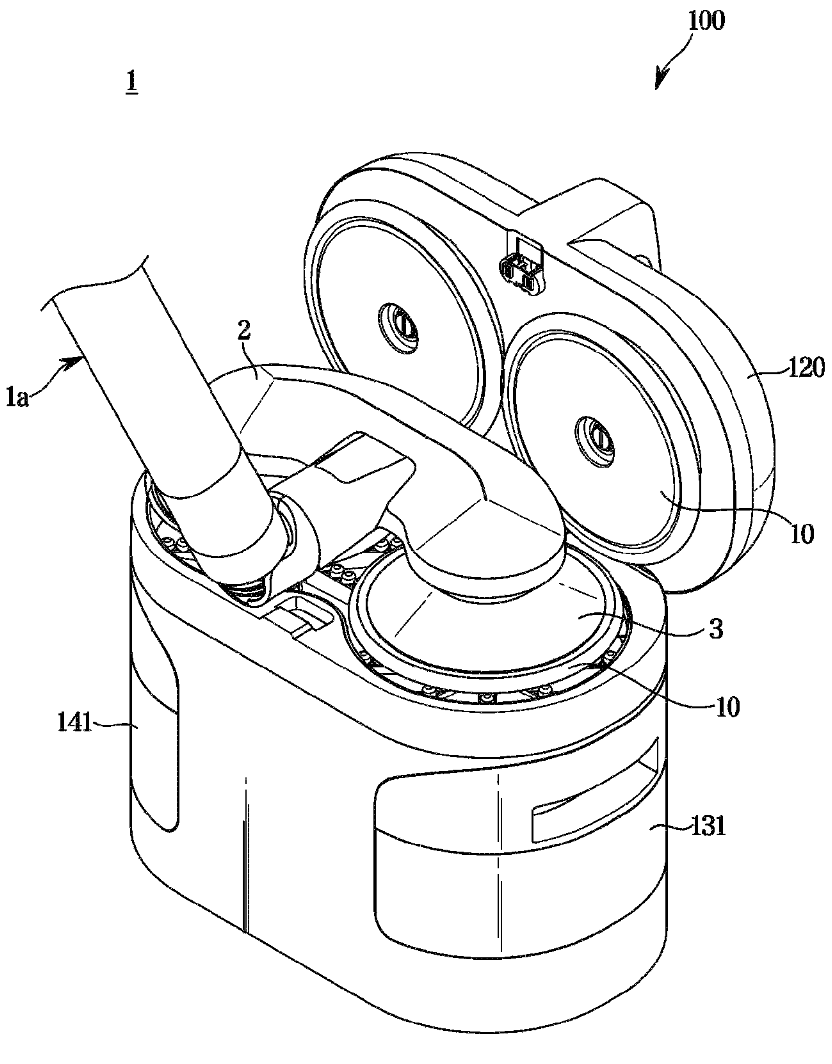
FIG. 11 is a view illustrating a floorcloth of a mop cleaner mounted to a floorcloth washer according to an embodiment of the disclosure.

FIG. 11 is a view illustrating a floorcloth of a mop cleaner mounted to a floorcloth washer according to an embodiment of the disclosure.

Figure 12:
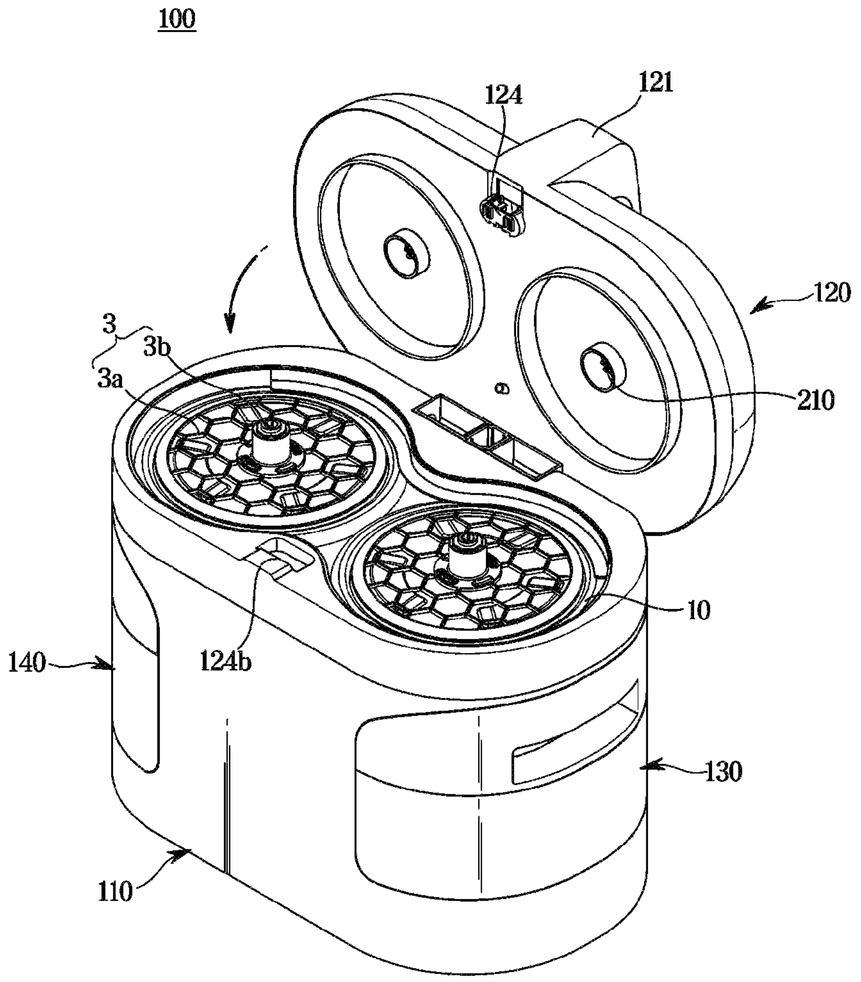
FIG. 12 is a view illustrating a floorcloth placed in a cleaning station of a floorcloth washer according to an embodiment of the disclosure.

FIG. 12 is a view illustrating a floorcloth placed in a cleaning station of a floorcloth washer according to an embodiment of the disclosure.

Referring to FIGS. 11 and 12, the process of washing, spin-drying and drying the floorcloth of the floorcloth washer 100 of the disclosure is briefly described as follows.

In order to wash the floorcloth 10 of the mop cleaner 1*a*, the cover 120 of the floorcloth washer 100 is opened and the floorcloth 10 of the mop cleaner 1*a* is placed on the cleaning station 150.

The washed floorcloth 10 is removed from the cover 120 of the floorcloth washer 100.

In order to separate the floorcloth 10 from the mop cleaner 1*a*, the guide rib 115 provided in the body 110 of the floorcloth washer 100 may be used. Because the guide rib 115 interferes with the floorcloth coupler 3 to which the floorcloth 10 is mounted, the floorcloth coupler 3 may be separated from the body 2 of the mop cleaner 1*a*.

When the floorcloth 10 and the floorcloth coupler 3 are accommodated in the cleaning station 150, the cover 120 is closed. As the cover 120 is closed, the rotating connector 260 of the cover 120 and the floorcloth coupler 3 are connected.

Because the rotating connector 260 is connected to the driving device 200, the floorcloth coupler 3 connected to the rotating connector 260 may be rotatably provided.

A washing mode of the floorcloth washer 100 proceeds when the power button 123 of the cover 120 is pressed by the user. When the power button 123 is pressed, the water supply valve 132 is operated by the controller 250 and water is supplied to the cleaning station 150 for a pre-determined time or in a pre-determined amount from the water tank 131 of the water supplier 130.

When water is supplied to the cleaning station 150, the motor 210 of the driving device 200 may rotate in a first direction CC and a second direction CCW, respectively.

The first motor shaft 211*a* and the second motor shaft 211*b* of the motor 210 may be respectively connected to the rotating connector 260. Therefore, the floorcloth 10 connected to the rotating connector 260 may rotate in the first direction CC and the second direction CCW, respectively. The rotational load of the motor 210 may be appropriate within approximately 200 to 250 RPM.

The floorcloth 10 rotated in the first direction CC and the second direction CCW by the motor 210 may come into contact with the cleaning plate 151 and rub against the cleaning protrusion 152. Accordingly, the floorcloth 10 is washed.

When a predetermined time or a predetermined number of rotations is completed, the drain valve 144 of the water drainage 140 may be opened. When the water of the cleaning station 150 completely drains out into the drain tank 141, the drain valve 144 may be closed.

When the drain valve 144 is closed, water may be supplied from the water tank 131 and the motor 210 may operate to rotate the floorcloth 10 again. This cycle may be repeated 2 to 3 times in total.

When the washing mode is completed, the spin-drying mode may proceed with the drain valve 144 open.

The spin-drying mode may be performed by rotating the floorcloth 10 as the motor 210 is rotated by the controller 250. In this case, the water supply valve 132 is closed to prevent water supply.

When the spin-drying is completed, the controller 250 may operate the fan 240 to supply air to the cleaning station 150. The floorcloth 10 may be dried by the air supplied to the cleaning station 150.

In a drying mode, the fan 240 and the motor 210 may be simultaneously driven. In the drying mode, the fan 240 may be driven to dry the floorcloth 10 while the floorcloth 10 is being rotated.

When washing, spin-drying and drying are completed, the user can open the cover 120 and remove the washed floorcloth 10.

As mentioned above, the user can automatically perform washing, spin-drying, and drying of the floorcloth 10 by the floorcloth washer 100. Therefore, the user's convenience can be improved.

Because washing and drying may be performed at once, it may be possible to quickly reuse the floorcloth. In addition, because, without directly touching the contaminated floorcloth by hand, the user separates and combines the floorcloth from and to the mop cleaner 1*a*, hygiene and convenience can be improved.

While the disclosure has been shown and described with reference to various embodiments thereof, it will be understood by those of skilled in the art that various changes in form and details may be made therein without departing from the spirit and scope of the disclosure as defined by the appended claims and their equivalents.

What is claimed is:

1. A mop cleaning system comprising:

a floorcloth;

a mop cleaner to which the floorcloth is detachably coupled; and a floorcloth washer configured to wash the floorcloth, wherein the floorcloth washer comprises:

a body comprising an opening formed therein, a cover provided to open and close the opening of the body, the cover rotatably coupled to the body via a hinge in an opened and closed position, a cleaning station provided at the opening of the body to accommodate the floorcloth, a water supplier provided at the body to supply water to the cleaning station, a water drainage provided at the body to drain water of the cleaning station, and a driving device comprising a driving motor positioned at the cover wherein, when the floorcloth is detached from the mop, the floorcloth washer is configured to connect to the floorcloth and rotate the floorcloth when the cover is in the closed position.

2. The mop cleaning system of claim 1, wherein the floorcloth washer further comprises a rotating connector provided at the cover and connected to the driving device to allow the floorcloth to be rotatable.

3. The mop cleaning system of claim 2, wherein the cleaning station comprises:

a cleaning plate provided to contact with the floorcloth; and an outlet formed at the cleaning plate and configured to discharge water to the water drainage.

4. The mop cleaning system of claim 3, wherein the cleaning plate comprises a plurality of cleaning protrusions protruding upwards of the cleaning plate to increase friction with the floorcloth.

5. The mop cleaning system of claim 3, wherein the cleaning plate may include a first cleaning plate and a second cleaning plate, and wherein the first cleaning plate is attached to the second cleaning plate.

6. The mop cleaning system of claim 2, wherein the driving device comprises:

a motor, and a plurality of gears transmitting a driving force of the motor to the rotating connector, and wherein at least one of the plurality of gears is connected to the rotating connector.

7. The mop cleaning system of claim 6, wherein the floorcloth washer comprises:

a rotating plate provided to be rotatable; and a rotating shaft provided at a center of the rotating plate and connected to a shaft of the motor.

8. The mop cleaning system of claim 7, further comprising:

a floorcloth coupler, wherein the floorcloth coupler and the driving device are connected by a magnet.

9. The mop cleaning system of claim 1, wherein the water supplier comprises:

a water tank detachably mounted at the body and storing water;

a water pump for supplying water from the water tank to the cleaning station; and a water supply passage connecting between the water tank and the water pump.

10. The mop cleaning system of claim 1, wherein the water drainage comprises:

a drain tank detachably mounted at the body and storing sewage discharged from the cleaning station; and a drain valve configured to open and close a connection between the drain tank and the cleaning station.

11. The mop cleaning system of claim 1, wherein the floorcloth washer further comprises a fan provided at the cover and supplying air to the cleaning station to dry the floorcloth.

12. The mop cleaning system of claim 11, wherein the floorcloth washer further comprises an air guide provided at the cover and guiding the air generated by the fan to the cleaning station.

13. The mop cleaning system of claim 11, wherein the floorcloth washer further comprises a water feeder provided at the cover and guiding water supplied from the water supplier to the cleaning station.

14. The mop cleaning system of claim 1, wherein the body further comprises a guide rib provided to separate the floorcloth from the mop cleaner.

15. The mop cleaning system of claim 1, wherein the floorcloth washer further comprises at least one processor configured to control the water supplier, the water drainage, and the driving device.

* * * * *